US011778273B2

(12) United States Patent
Larson et al.

(10) Patent No.: US 11,778,273 B2
(45) Date of Patent: Oct. 3, 2023

(54) SYSTEMS AND METHODS FOR MULTI-DEVICE CONTENT RECOMMENDATIONS

(71) Applicant: Rovi Guides, Inc., San Jose, CA (US)

(72) Inventors: Danielle Larson, Santa Monica, CA (US); Michael R. Nichols, La Canada Flintridge, CA (US)

(73) Assignee: Rovi Guides, Inc., San Jose, CA (US)

(*) Notice: Subject to any disclaimer, the term of this patent is extended or adjusted under 35 U.S.C. 154(b) by 0 days.

(21) Appl. No.: 17/005,482

(22) Filed: Aug. 28, 2020

(65) Prior Publication Data

US 2020/0396508 A1 Dec. 17, 2020

Related U.S. Application Data

(63) Continuation of application No. 16/427,920, filed on May 31, 2019, now Pat. No. 10,791,371, which is a continuation of application No. 15/705,972, filed on Sep. 15, 2017, now Pat. No. 10,313,757, which is a continuation of application No. 14/582,325, filed on Dec. 24, 2014, now Pat. No. 9,800,935.

(51) Int. Cl.
*H04N 21/466* (2011.01)
*H04N 21/442* (2011.01)

(52) U.S. Cl.
CPC ... *H04N 21/4668* (2013.01); *H04N 21/44218* (2013.01); *H04N 21/44226* (2020.08); *H04N 21/4667* (2013.01)

(58) Field of Classification Search
CPC ......... H04N 21/4668; H04N 21/44218; H04N 21/44222; H04N 21/4667
See application file for complete search history.

(56) References Cited

U.S. PATENT DOCUMENTS

| | | | |
|---|---|---|---|
| 8,752,206 B2 | 6/2014 | Joseph et al. | |
| 9,800,935 B2* | 10/2017 | Larson | H04N 21/44218 |
| 10,313,757 B2* | 6/2019 | Larson | H04N 21/4667 |
| 10,791,371 B2* | 9/2020 | Larson | H04N 21/4668 |
| 2005/0102696 A1 | 5/2005 | Westberg | |
| 2007/0157242 A1 | 7/2007 | Cordray et al. | |
| 2008/0307462 A1* | 12/2008 | Beetcher | H04N 21/440236 |
| | | | 725/53 |
| 2009/0043692 A1 | 2/2009 | Pippuri et al. | |
| 2009/0119711 A1* | 5/2009 | Kitayama | H04N 21/4882 |
| | | | 725/39 |
| 2010/0211636 A1 | 8/2010 | Starkenburg et al. | |

(Continued)

*Primary Examiner* — Kyu Chae
(74) *Attorney, Agent, or Firm* — Haley Guiliano LLP

(57) ABSTRACT

Methods and systems are disclosed herein for a media guidance application that provides content recommendations based on recent activity. For example, the media guidance application determines that the user has stopped using the first device and is using the second device. In response, the media guidance application retrieves, from memory, a length of time that the user has consumed media on the first device. The media guidance application then determines the time interval when the user was consuming media on the first device. Next, media content is determined that the user consumed on the first device during the time interval. The media guidance application then determines a characteristic of the consumed media content and recommends media content on a second device based on the characteristic.

20 Claims, 5 Drawing Sheets

(56) References Cited

U.S. PATENT DOCUMENTS

| | | |
|---|---|---|
| 2010/0262986 A1 | 10/2010 | Adimatyam et al. |
| 2011/0016492 A1 | 1/2011 | Morita |
| 2011/0102675 A1* | 5/2011 | Jackson ............. H04N 5/44543 348/558 |
| 2012/0210343 A1 | 8/2012 | McCoy et al. |
| 2012/0227080 A1* | 9/2012 | Endo ................. H04N 21/4333 725/115 |
| 2013/0263186 A1 | 10/2013 | McCoy et al. |
| 2014/0156792 A1 | 6/2014 | Roberts et al. |
| 2014/0196069 A1* | 7/2014 | Ahmed ............. H04N 21/4524 725/14 |
| 2014/0344848 A1* | 11/2014 | Busse ................. H04N 21/466 725/28 |
| 2015/0128150 A1 | 5/2015 | Ueda et al. |
| 2015/0128160 A1 | 5/2015 | Benea et al. |
| 2015/0142798 A1* | 5/2015 | Poupko ................... H04L 67/55 707/736 |
| 2015/0296047 A1* | 10/2015 | Ghazisaidi ............. H04L 65/80 709/219 |
| 2015/0370466 A1* | 12/2015 | Hoffert ............ H04N 21/42204 715/720 |
| 2016/0066040 A1* | 3/2016 | Webster ............. H04N 21/4667 725/34 |
| 2016/0142783 A1 | 5/2016 | Bagga et al. |
| 2016/0192005 A1 | 6/2016 | Larson et al. |
| 2017/0026443 A1 | 1/2017 | Januszewski |
| 2021/0026518 A1* | 1/2021 | Lewis ................... G06F 16/487 |
| 2021/0176531 A1 | 6/2021 | Larson et al. |

\* cited by examiner

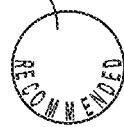
FIG. 5

600

602 — Determine that a User Has Stopped Using a First Device and is Using a Second Device

604 — In Response to Determining that the User Has Stopped Using the First Device and is Using the Second Device, Retrieve a Threshold Length of Time from Memory

606 — Determine a Period of Time Beginning at a Point in Time when the User Began Using the Second Device and Extending Backwards for the Threshold Length of Time

608 — Determine First Media Content Consumed by the User on the First Device During the Period of Time

610 — Determine a Characteristic of the First Media Content

612 — Recommend, Based on the Characteristic, Second Media Content for Consumption on the Second Device

FIG. 6

SYSTEMS AND METHODS FOR MULTI-DEVICE CONTENT RECOMMENDATIONS

CROSS-REFERENCE TO RELATED APPLICATIONS

This application is a continuation of U.S. patent application Ser. No. 16/427,920, filed May 31, 2019, which is a continuation of U.S. patent application Ser. No. 15/705,972, filed Sep. 15, 2017 (now U.S. Pat. No. 10,313,757), which is a continuation of U.S. patent application Ser. No. 14/582,325, filed Dec. 24, 2014 (now U.S. Pat. No. 9,800,935), the disclosures of which are hereby incorporated by reference herein in their entireties.

BACKGROUND

In conventional systems, users have access to a plethora of media content. With so much content available, users often require assistance in selecting content, and content providers often require assistance in selecting what content to provide to users. To aid in selecting content, systems often collect data related to what content a user watches (or does not watch), what devices the user watches that content on, etc. and stores this information. Despite collecting and storing vast amount of data on users, users often access content on multiple devices, and data collected and stored on one device is not used when recommending content on another device.

SUMMARY

Accordingly, systems and methods are described herein for a media guidance application that facilities sharing data collected on one device with another device to tailor recommendations of media content to a particular user. Moreover, in order to recommend content having the greatest interest to a user at a particular time, the media guidance application bases the recommendations it is providing on a second device on content recently consumed by the user on a first device. Specifically, the media guidance application may monitor content that the user recently consumed on a first device (e.g., a set-top box connected to a television) and may then recommend other content for consumption to the user on a second device (e.g., smart phone) based on the content that the user recently consumed on the first device. For example, just prior to a user leaving her home, the user may be watching a news story about an approaching winter storm on a television. When the user leaves her home, the media guidance application may determine that the user will likely want to continue receiving information about the storm. Therefore, the media guidance application may search content available in the user's car or on the user's smart phone for programs that include information about the approaching winter storm. For example, while the media guidance application may not have access to the same news program that the user consumed in her house, the media guidance application may have access to similar content. If the media guidance application finds content that includes information about the approaching winter storm, the media guidance application may alert the user that this content is available for consumption.

Furthermore, in response to receiving a user selection of the alert, the media guidance application may provide access to the available content, additional information about the available content, or a list of available programs if the available content includes multiple programs. For example, if the media guidance application can access only one program with information about the approaching winter storm, in response to the user selection of the alert, the media guidance application may tune to the program and/or provide additional information about the program.

In some aspects, the media guidance application may determine that a user has stopped using a first device and is using a second device. For example, the media guidance application may determine that a user is no longer inputting commands into the first device and is inputting commands into a second device. In another example, the media guidance application may detect that the user has moved from a location that is associated with the first device to a location associated with a second device. In yet another example, the media guidance application may determine that the user has powered off the first device and powered on the second device in order to determine that the user has stopped using the first device and is using the second device.

The media guidance application may, in response to determining that the user has stopped using the first device and is using the second device, retrieve a threshold length of time from memory. For example, the media guidance application may only determine what content the user recently consumed on the first device. To determine only content that a user recently consumed on a device, the media guidance application may determine the media content that the user consumed during a portion of the time that the user was consuming media content on the first device as opposed to the entire time that the user was consuming media content on the first device. For example, the threshold time period may represent only last ten minutes of the entire hour that the user consumed media content on the first device.

The media guidance application may then determine a period of time beginning at a point in time when the user began using the second device and extending backwards for the threshold length of time. For example, if the user started using the second device at 10:00 PM, and the threshold length of time was ten minutes, the media guidance application may determine the media content consumed by the user, on the first device from 9:50 PM to 10:00 PM.

The media guidance application may then determine first media content consumed by the user on the first device during the period of time. For example, the media guidance application may determine whether or not the first device (e.g., the set-top box) was tuned to a specific channel, watching a particular movie, etc. In some embodiments, the media guidance application may compare media guidance data (e.g., program listings) corresponding to media content the user consumed during the threshold length of time on the first device in order to identify the media content.

The media guidance application may then determine a characteristic (e.g., a genre, a subject matter, a title, a type, a featured actor, a featured character, etc.) of the first media content. For example, the media guidance application may detect that the user is watching a documentary about a musician on a television via a set-top box.

The media guidance application may then recommend, based on the characteristic, second media content for consumption on the second device. For example, the media guidance application may filter available media content based on whether the available media content is associated with the characteristic to determine the second media content to recommend. For example, if the characteristic is a name of a musician about whom the user was watching a documentary on the first device, the media guidance application may recommend, to the user, music and/or other content by the same musician on a second device.

In some embodiments, the media guidance application generates for display recommendations only on devices associated with the user and likewise bases recommendations on the media content consumed on devices associated with the user. For example, the media guidance application may store a list of devices associated with the user and recommend, based on the characteristic, second media content for consumption on each device in the list of devices. For example, the media guidance application may associate a set-top box connected to a television, an electronic tablet, and a smart phone with a user. If the user is watching a movie on a television via a set-top box featuring a specific actor, the media guidance application may recommend, on an electronic tablet, a different movie to the user featuring the same actor.

In some embodiments, the media guidance application may recommend content in a different format than the content previously consumed by the user. For example, media content consumed on a first device may include video content while media content recommended to a user on another device may include audio content. For example if the user is consuming a music video on a first device, the media guidance application may find, for consumption on the second device, music by the same artist in an audio format only.

In some embodiments, the media guidance application may select a threshold length based on one or more factors. For example, the threshold length of time may be based on an amount of time the user continuously used the first device immediately before using the second device. For example, the user may be consuming content on a set-top box connected to a television throughout the day. The media guidance application may store, in memory, the time the user started consuming content on the set-top box. The media guidance application may then monitor user's consumption on the set-top box. When the user stops consuming media content on the set-top box, the media guidance application may store, in the memory, the time the user stopped consuming content. When the user starts consuming content on the set-top box again, the media guidance application may overwrite the start time and the end time with new values. As a result, the threshold length of time stored, in memory, will be based on an amount of time the user sporadically used the first device before using the second device, while compensating for time when the first device was idle.

In some embodiments, the media guidance application may determine the characteristic of the media content upon which content recommendations are based using one or more techniques. For example, the media guidance application may determine a plurality of content types consumed by the user during the threshold length of time on the first device and determine the characteristic based on a content type of the plurality of content types most frequently consumed by the user. For example, if the user consumed a total of three hours of content and during those three hours the user consumed two and a half hours of music videos and half of an hour of news programs, the media guidance application may determine the characteristic of the media content based only on the music videos consumed by the user.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 5 shows an illustrative embodiment of a set of display screens used to provide recommended content, in accordance with some embodiments of the disclosure;

FIG. 6 is a flowchart of illustrative steps involved in recommending content on a second device based on content recently consumed by a user on the first device, in accordance with some embodiments of the disclosure.

DETAILED DESCRIPTION

Figure 1:
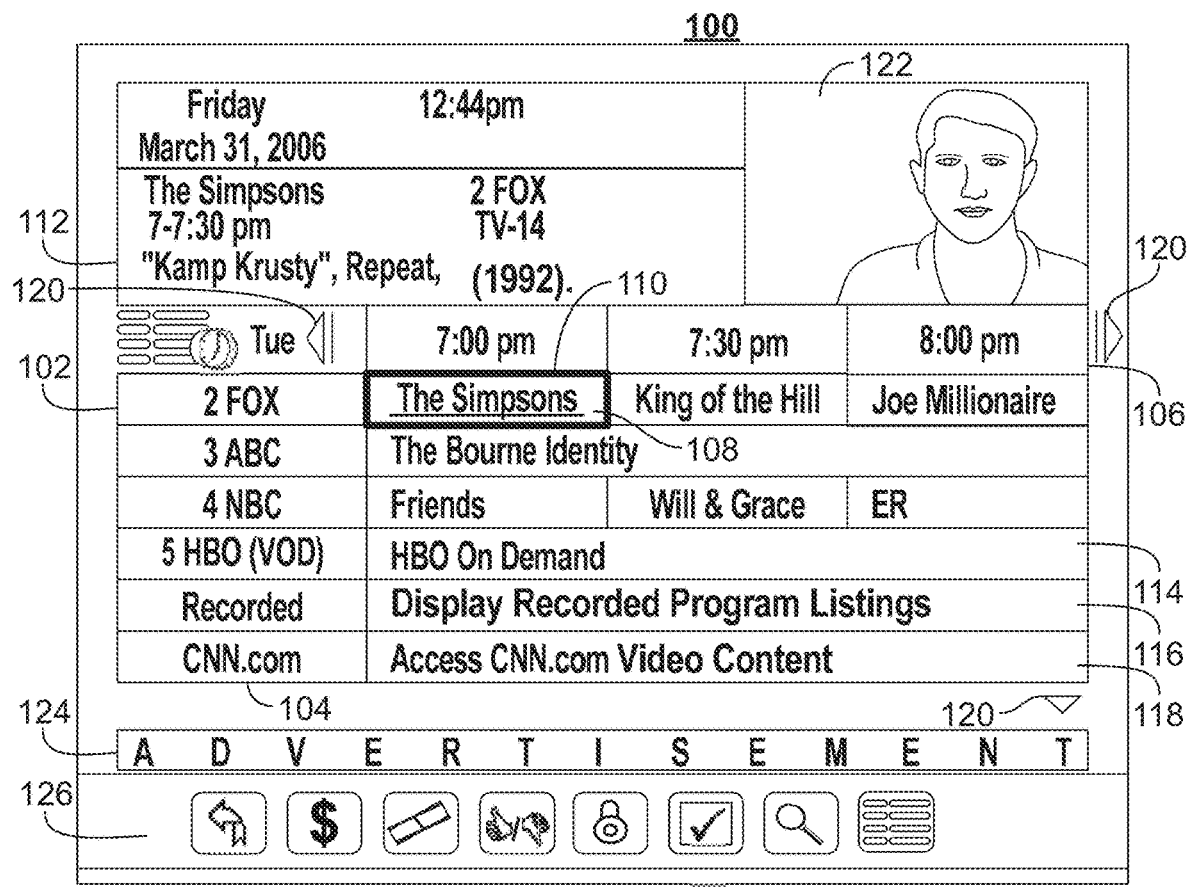
FIG. 1 shows an illustrative embodiment of a display screen that may be used to provide media guidance application listings and other media guidance information, in accordance with some embodiments of the disclosure.

Systems and methods are described herein for a media guidance application that facilities sharing data collected on one device with another device to tailor recommendation 47554432_1s of media content to a particular user. Moreover, in order to recommend content having the greatest interest to a user at a particular time, the media guidance application bases the recommendations it is providing on a second device on content recently consumed by the user on a first device.

As referred to herein, a "media guidance application" or a "guidance application" is an application that provides media guidance data to a user through an interface. For example, a media guidance application may allow users to efficiently navigate content selections and easily identify content that they may desire. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Media guidance applications may generate graphical user interface screens that enable a user to navigate among, locate and select content.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

The media guidance application may present media guidance data on a user device. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same.

In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

In some embodiments, the media guidance data provided by the media guidance application may appear as a recommendation of media content. For example, a user may consume content on an electronic tablet while commuting from work to her home. The media guidance application may determine that the user was watching romantic comedies on the electronic tablet during her commute, and based on that, recommend to the user other romantic comedies to watch on the user's television via a set-top box.

In some embodiments, a media guidance application may generate for display recommendations in response to determining that a user has stopped using a first device and is using a second device. To determine when a user is using or otherwise interacting with a particular device, the media guidance application may employ numerous techniques. For example, the first device may be a set-top box and a second device may be smart a phone. The media guidance application may determine that the user is using the set-top box by detecting user input (e.g., tuning to a specific channel) into the set-top box. The user may interact with the set-top box by direct contact, via a remote control, via another device, via voice commands, or any other means available to the user.

The media guidance application may catalogue the use of each device to determine whether or not a user is interacting with the device. For example, every time the media guidance application detects a user input into the set-top box, the media guidance application may start a timer to keep track of the amount of time passed since the user input. When the timer reaches a threshold number, the media guidance application may determine that the user has stopped using the set-top box. The media guidance application may also start monitoring other devices for user input. Once user input is detected on another device, the media guidance application may determine that the user is using a second device.

In some embodiments, the media guidance application may, in response to determining that the user has stopped using the first device and is using the second device, retrieve a threshold length of time from memory. As referred to herein, a "threshold length of time" is a length of time used to indicate media content recently consumed by a user on a device. For example, the threshold length of time may begin at a point in time when a user starts consuming media content on a second device (or stops consuming media content on a first device) and extend backwards through time to a point in time during which a user was consuming media content on a first device. The media guidance application may determine media content consumed by the user from the point in time during which the user was consuming media content on the first device to a point in time at which the user stopped consuming media content on the first device. The media guidance application may then identify the determined media content as media content recently consumed by the user. This recently consumed media content may be used by the media guidance application to determine additional media content (and/or determine criteria for the additional media content) that a user would like to consume on a second device when the user begins to consume media content on the second device.

The threshold length of time may be calculated in various units of measure. For example, the threshold length of time may be calculated in seconds, minutes, and/or other increments of time. Alternatively or additionally, the threshold length of time may be calculated in a number of media assets consumed by the user. For example, the threshold length may correspond to a particular number of songs previously consumed by the user. For example, the media guidance application may base recommendations for additional media content on a device on the last four songs previously consumed by a user on a different device.

The media guidance application may select the points in time that define the threshold length of time based on various criteria. For example, the points in time may be determined based on when a user started using a second device, when a user stopped using a first device, the length of time between using the first device and the second device, the type of device used to consume the media content, the type of content consumed by the user on the devices, etc.

For example, the media guidance application may be activated on a first device (e.g., an electronic tablet) and on a second device (e.g., a smart phone). When the user starts consuming media content on the electronic tablet, the media guidance application may activate a timer on the electronic tablet. When the media guidance application determines that the user stopped consuming the media content on the electronic tablet and started using the smart phone, it may transmit a request to the electronic tablet to stop the timer and transmit the timer's elapsed time to the smart phone. Once the smart phone receives that elapsed time, the value may be stored in memory for later retrieval.

In another example, the media guidance application may store, in memory, a time when the user starts consuming media content on a first device ("Start Time"). When the media guidance application determines that the user is using the second device, it may request that the Start Time be transmitted from the first device to the second device. Once the media guidance application receives the Start Time on the second device, the media guidance application may calculate the threshold length of time based on the difference between the current time and the Start Time. The threshold length of time may then be stored in memory for later retrieval.

In yet another example, the media guidance application may determine that the user is consuming media content in intervals. The user may be consuming media content on an electronic tablet. The user may, for example, be watching Internet videos on the tablet. However, while watching the Internet videos, the user may be interrupted because she may need to help her children with their homework. While the user is helping her children with their homework, the Internet videos may be continuing to play on the electronic tablet, but the user is not consuming the videos during that time. The media guidance application may determine that the interruption is occurring by detecting, via a camera for example, that the user is not looking at the tablet. When the user is done helping her kids with their homework, she may resume watching the internet videos. As a result the media guidance application may store two threshold lengths of time in order to take into account the interruption.

In yet another example, the media guidance application may determine a threshold length of time based on the media asset the user was consuming last. For example, the user may be watching an episode of "Saved by the Bell" on a television via a set-top box. If the user has to leave her home, she may take her electronic tablet with her. The media guidance application may determine that the threshold length of time is the amount of time the user spent watching "Saved by the Bell" because the user may want to watch another "Saved by the Bell" episode on her electronic table.

In some embodiments, the media guidance application may determine a period of time beginning at a point in time when the user began using the second device and extending backwards for the threshold length of time. For example, the media guidance application may retrieve the current time from the second device and store it in memory as ending time for the period. The media guidance application may further determine the starting time for the period by subtracting the threshold length of time from the ending time. The ending time and the starting time together may then be stored in memory to indicate the period of time.

In some embodiments, the media guidance application may determine first media content consumed by the user on the first device during the period of time. For example, the media guidance application may determine that the user watched "Dumb and Dumber" and "The Big Bang Theory" on the first device (e.g., a television via set-top box). As part of determination, the media guidance application may analyze media content listings associated with the two media assets and may store the information in those content listings for retrieval at a later time.

In another example the user may have consumed media content on the first device (e.g., an electronic tablet) that does not have content listings associated with it (e.g., Internet videos). The media guidance application may store in memory characteristics associated with the consumed media content. As defined herein, a "characteristic" is any information about a media asset that may be used to categorize the media asset and/or distinguish the media asset from other media assets. For example, characteristics of media content may include any information about the media content as well as any information within the media content. For example, characteristics may be genre, title, length, source, actors, etc. If a user started watching an Internet video, the media guidance application may keep track of characteristics associated with the video. These characteristics may be retrieved from the Internet video itself, metadata associated with the video, or the Internet site that is making the Internet video available to users. Once the media guidance application retrieves these characteristics it may store them on the first device. These characteristics may later be sent to the second device.

In some embodiments, the media guidance application may determine a characteristic of the first media content. For example, if the user is listening to the radio while commuting in her car, she may be listening to rock music only. As a result the media guidance application may determine that "rock music" is a characteristic of the first media content. Alternatively, or additionally, the media guidance application may determine that a characteristic of the first media content is music by a specific rock band and/or artist based on the user listening to music by that rock band or artist.

In some embodiments, the media guidance application may determine the most popular or prevalent subset of media content recently consumed by the user. For example, all of the videos watched by the user may not have a common characteristic, but a subset of the videos may (e.g., the subset may correspond to a cooking show genre). The media guidance application may determine the characteristic based on that subset only. For example, if the media guidance application determines that a user watched a hockey game, three cooking shows, and a news program, the media guidance application may determine, based on the program listings associated with those programs, for example, that the programs have no common characteristics associated with them. However, the cooking shows have a common characteristic associated with them. As a result, the media guidance application may determine the characteristic of the first media content based on the cooking shows only.

In yet another example, the media guidance application may determine that the videos watched by the user may be divided into a number of subsets where each subset shares a characteristic. The media guidance application may determine that a characteristic of the first media content may be the subset that has the most videos associated with it. Alternatively or additionally, the media guidance application may determine multiple characteristics of the first media content. For example, these multiple characteristics may be based on the subsets described above. The media guidance application may further rank the subsets based on the amount of time the user consumed content associated with a particular subset. For example, if the user was watching a 2-hour movie on an electronic tablet and then a 15-minute news segment, the media guidance application may rank the subset that includes the 2-hour movie higher then the subset that includes the 15-minute news segment. Additionally, or alternatively, the media guidance application may rank the subsets based on the number of media assets in each subset. For example, the user may have listened to ten 3-minute rock songs on her smartphone and also watched an hour long episode of "Star Trek". The media guidance application may determine two characteristics for the consumed media content. The first characteristic may be "rock music" and the second "sci-fi shows". The ten rock songs may go into the first subset and "Star Trek" may go into the second subset. "Rock music" may be ranked higher because of ten songs in the subset versus only one show, despite the show being longer. There may be other ranking criteria for the characteristics. These can be ranked based on user preferences in the user profile. They can be also based on what content was consumed most recently and whether the user consumed the whole program associated with the characteristic or whether the user switched to another program in the middle.

In another example the ranks may be determined by a weighted average of some or all the methods described above. For example, if a user watched a 2-hour movie and listened to ten 3-minute songs, the media guidance application may determine that each 3-minute song is equivalent to consuming eighteen minutes of the movie. As a result the rank of the characteristic may be determined based on both the length of the media content and the number of the media assets.

In some embodiments, the media guidance application may recommend, based on the characteristic, second media content for consumption on the second device. For example, the media guidance application may receive the characteristic of the first media content on the second device. Once the second device receives the characteristic, the media guidance application may search media content available on the second device for media assets that match the characteristic. For example, the characteristic of the first media content consumed on a set-top box connected to a television may be "Sherlock Holmes," based on a user watching movies featuring this character. If the user switches to a smart phone as her second device, the media guidance application may search the smart phone for "Sherlock Holmes" media content. If the user's smart phone has access to media listings, the media guidance application may search those listings for "Sherlock Holmes." Additionally or alternatively, if the user's smart phone has access to the Internet through a cellular and/or Wi-Fi connection, the media guidance application may search Internet sites for content matching "Sherlock Holmes." As an example, the media guidance application may use any commercial search engine for this search. The media guidance application may narrow down the search, if appropriate, to only video assets (e.g., movies), audio assets (e.g., audio books, narratives), and/or textual content (e.g., short stories). If the media guidance application receives multiple characteristics on the second device, it may execute the search described above for each of the characteristics received and return media content recommendations corresponding to each characteristic. The characteristics may be ranked as described above. If the characteristics are ranked, the media guidance application may only present to the user media content associated with the highest ranked characteristic or it may present to the user content in order of the rankings.

In some embodiments, the media guidance application may store a list of devices associated with the user and recommend, based on the characteristic, the second media content for consumption on each device in the list of devices. For example, a user may have three devices associated with her (e.g., a set-top box connected to a television, an electronic tablet, and a smart phone). The user may be consuming media content on the set-top box connected to a television. The user may stop using the set-top box and start using the electronic tablet. As a result, the media guidance application may recommend media content available on the electronic tablet based on the characteristic. If the user later starts using her smart phone, the media guidance application may recommend media content available on the smart phone based on the characteristic.

In some embodiments, determining that the user has stopped using the first device and is using the second device comprises detecting that the user has moved from a first location that is associated with the first device to a second location that is associated with the second device. For example, the user's home entertainment system may be associated with the user's home and the user's car entertainment system may be associated with the user's car. A user may be listening to music on her home entertainment system. When the media guidance application determines that the user has now activated her car entertainment system, the media guidance application may determine that the user stopped using the first device and is using the second device.

In some embodiments, determining that the user has stopped using the first device and is using the second device comprises detecting that the user has stopped interacting with the first device and is interacting with the second device. For example, a user may be using her smart phone to listen to music. The media guidance application may be detecting every user input into the smart phone and storing the time of the user input. The media guidance application may activate a timer when user input is detected and also store in memory the last input time corresponding to the current time. Once the timer reaches a threshold value, the media guidance application may make a preliminary determination that the user has stopped using the smart phone. The media guidance application may then monitor a second device for user input. If user input is detected on the second device, the media guidance application may determine that the user has stopped using the first device and is using the second device. However, if user input is detected on the first device after the threshold value has been reached, the media guidance application may update the last input time with a new time and restart the timer.

In some embodiments, the first media content comprises video content and the second media content consists of audio content. For example, the user may be watching a movie on a first device (e.g., electronic tablet) and then switch to a device that only supports audio (e.g., car radio).

As a result, the characteristic of the first media content on the first device may be based on media content comprising video and the recommendation on the second device may be of an audio only content.

In some embodiments, the threshold length of time is based on an amount of time the user continuously used the first device immediately before using the second device. For example, a user may be consuming content on an electronic tablet throughout the day. She may watch the news in the morning, some soap operas in the afternoon, and some Internet videos and a news program in the evening. As a result, the media guidance application may store a threshold length of time based only on the time the user was consuming the Internet videos and the news program in the evening. Since the media content consumed in the morning and in the afternoon was not consumed continuously with the content consumed in the evening, this content is not used in the threshold length of time. Alternatively or additionally, the media guidance application may determine the characteristics based on sporadic use of the first device.

In some embodiments, determining the characteristic of the first media content comprises determining a plurality of content types consumed by the user during the period of time on the first device and determining the characteristic based on a content type of the plurality of content types most frequently consumed by the user. For example, the media guidance application may divide media content into content types, based on the characteristics of the media content. The types of media content may be movies, news programs, episodes of a series, music, music videos, cartoons, sporting events, sitcoms, etc. Media content may be further subdivided. For example, movies may be divided into action, comedies, romance, documentaries, classics, children, dramas, horror, thrillers, etc. Cartoons may be divided into adult cartoons and children's cartoons. The media guidance application may determine the characteristic of the media content based on media content listings associated with specific media assets, it may be retrieving those characteristics from a website providing the media assets, it may be accessing meta-data associated with the media assets for the characteristics, or it may be retrieving that information from a database. An example of such a database may be found at www.imdb.com. The media guidance application may determine that the user has consumed sitcoms, news programs and music videos on the first device. The media guidance application may determine the type of content of each of those media assets, based on the media content listings for those media assets. The media guidance application may then determine which type of media content the user has consumed most frequently. For example, the user may have consumed a total of three hours of media content on the first device. The user may have consumed two hours of sitcoms, thirty minutes of music videos, and a thirty minute news program. As a result, the media guidance application may determine the characteristic based on only the two hours of sitcoms that the user consumed. In another example, the media guidance application may determine the characteristic of the first media content based on the type of content the user consumed last. As a result, in the example above, if the user consumed two hours of sitcoms, a thirty minute news program, and thirty minutes of music videos in that order, the media guidance application may determine the characteristic of the first media content based on the thirty minutes of music videos only.

In some embodiments, the media guidance application may generate an alert that indicates to the user that the second media content is available on the second device. An "alert," as defined herein, may be any communication to a user that apprises the user of one or more occurrences. For example, the alert may alert the user of the availability of media content recommendations that are based on content recently consumed by the user on a different device. It should be noted that the alert may include audio, video, and/or text based alerts.

In some embodiments, an alert may be generated together with a listing of recommended media content. For example, if a media guidance application determines that a content recommendation is available, the media guidance application may notify the user of the availability of the media content recommendation by having the second device alert the user (e.g., through a vibration, an audio tone, a visual cue, etc.). The media guidance application may alert the user of the available media content recommendation in different ways based on the type of media content that is available. For example, if the available recommendation is for a movie, the media guidance application may notify the user through a visual cue. If the recommendation is for a song, the media guidance application may generate an audio tone. The media guidance application may also notify the user of the number of media assets recommended to the user. For example, if the media guidance application determines that three media assets are being recommended to a user, the media guidance application may cause the electronic tablet to vibrate three times. Of course, if many media assets are recommended, the media guidance application may vibrate a maximum of five times in order to avoid irritating the user. Additionally or alternatively, the media guidance application may generate for display, to the user, a visual cue of a number of media assets that are recommended.

Figure 2:
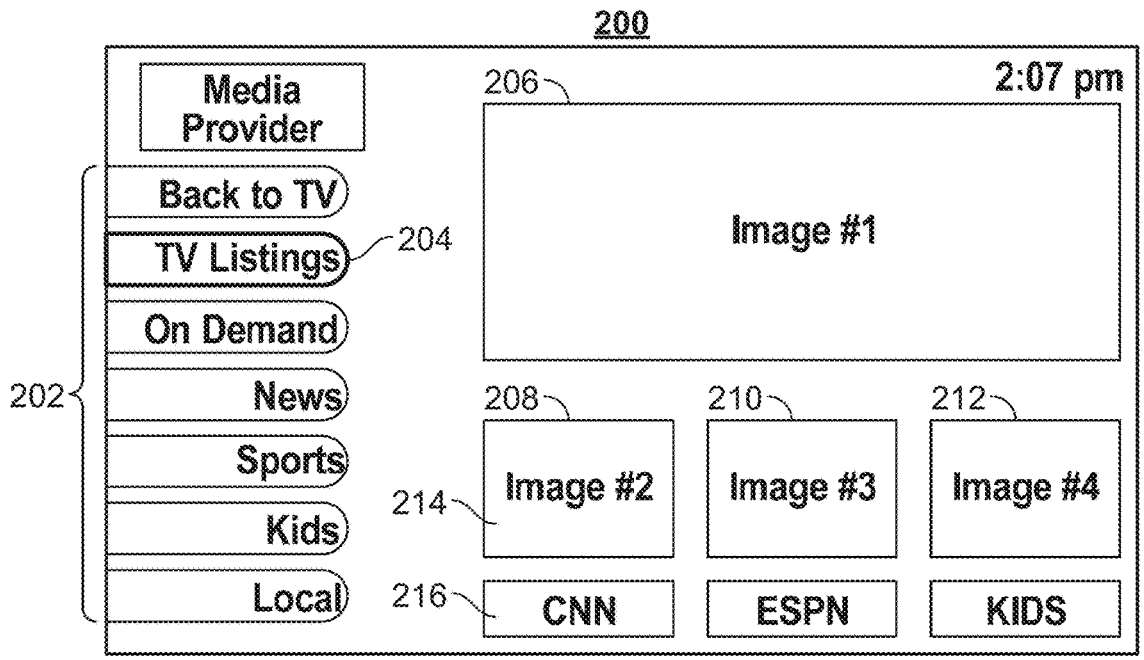
FIG. 2 shows another illustrative embodiment of a display screen that may be used to provide media guidance application listings, in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from another other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
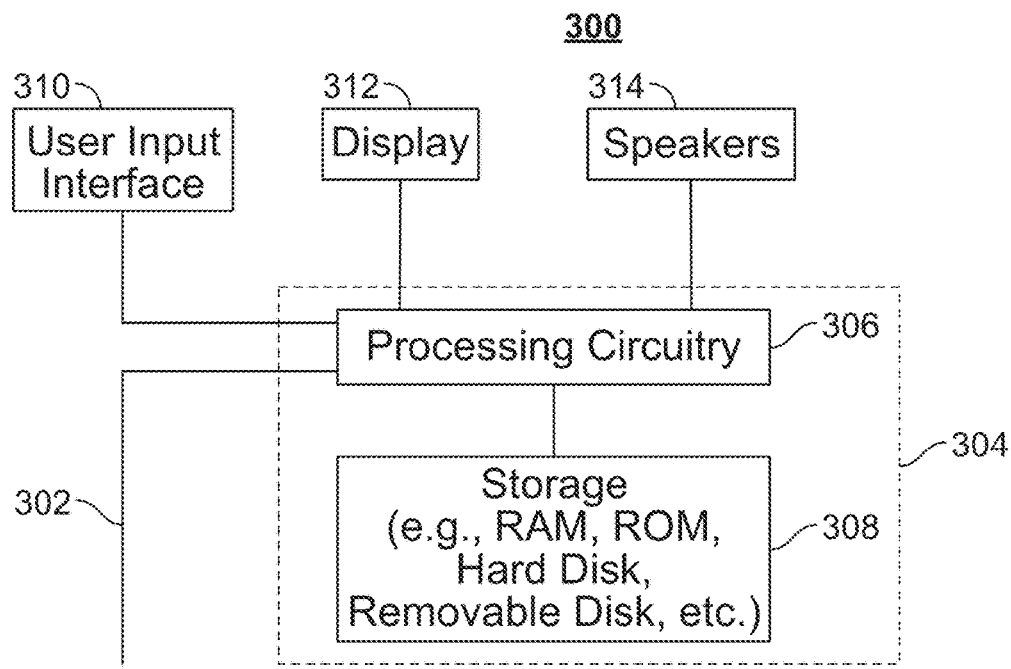
FIG. 3 is a block diagram of an illustrative device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
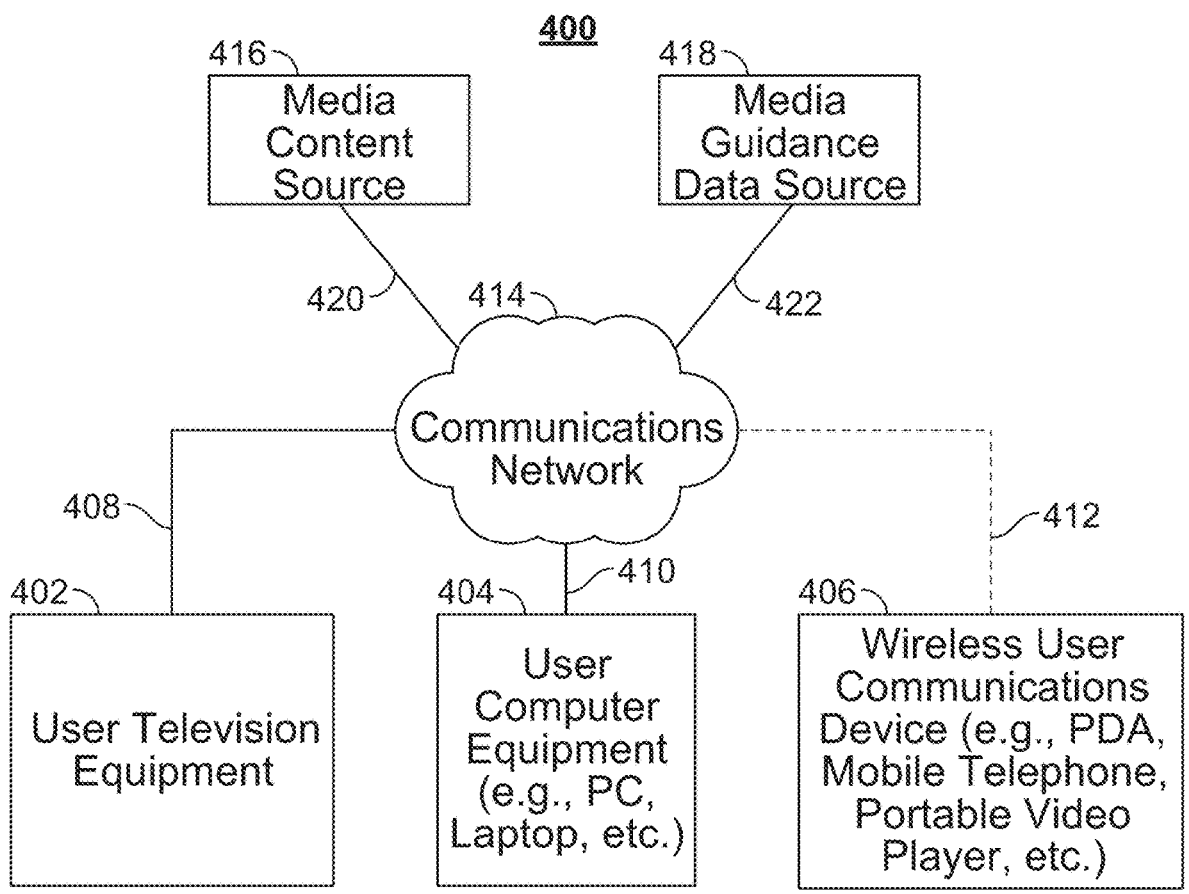
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

FIG. 5 shows an illustrative example of screens used to generate for display recommendations to a user. Display screen 500 presents a display 502 of program listings and an alert 504 which indicates availability of recommended content. For example, in display screen 500, the media guidance application has determined that media content is available on a second device based on a characteristic of media content consumed by a user on a first device. For example, the media guidance application (e.g., via control circuitry 304 (FIG. 3)) may determine that media content available on the second device has similar characteristics to media content recently consumed on a first device. As a result, the media guidance application generated for display alert 504. Alert 504 may be selectable by the user. When the user selects alert 504, the media guidance application may present to the user display 550.

Alternatively or additionally, the media guidance application may automatically, without user input, generate for display listings for media content available on the second device that has similar characteristics to media content recently consumed on a first device. For example, in response to a user powering on the second device, the media guidance application may cause media listings to appear (or begin playback of a media asset) on a display (e.g., display 312 (FIG. 3)) on the second device.

Display 550 may present to the user one or more media listings 552 of media assets available on the second device based on the characteristic of media content consumed by the user on the first device. The presented media listings 552 may include information about the media asset (e.g., title, length, etc.). The presented media listings 552 may also be user-selectable. When the user selects one of the media listings 552, the user may be given more information about the media asset. Additionally or alternatively, the user may be given an option to start consuming the media asset and/or an option to instruct the media guidance application to never recommend the selected media asset again.

Furthermore, media listings 552 may represent media content that was available on the first device or may represent media content that was not available on the first device. For example, media listings 552 may represent media content that is formatted for display on the second device. For example, if the second device has only standard definition resolution, media listing 552 may represent standard definition version of media content available in high definition on the first device. In another example, if the second device has only audio output capabilities, media listing 552 may represent audio-only versions of media content available in audio and video on the first device. In yet another example, if the second device has access to only non-subscription media content, media listing 552 may represent only non-subscription media content similar to the subscription media content available on the first device.

In some embodiments, the graphic properties of alert 504 may vary based on the media content that is the subject of the alert. For example, the color of alert 504 may represent how popular the recommended content is on social media sites. The color red may indicate that the recommended media content is very popular and blue may indicate that the recommended media content is not very popular. Alert 504 may be of a number of other colors that may indicate different degrees of popularity of the recommended media content. The color of alert 504 may also represent a number of media assets available. For example, red may indicate ten or more media assets available, green may represent availability of at least five recommended assets but no more than ten, and blue may represent one to four recommended media assets available. Additionally or alternatively, alert 504 may have a number inside of the circle that may represent a number of recommended media assets available.

FIG. 6 is a flowchart of illustrative steps involved in recommending content on a second device based on content consumed by a user on a first device. It should be noted that process 600 or any step thereof could be performed on, or provided by, any of the devices shown in FIGS. 3-4. For example, process 600 may be executed by control circuitry 304 (FIG. 3) as instructed by a media guidance application implemented on user equipment 402, 404, and/or 406 (FIG. 4) in order to distribute control of media guidance application operations for a target device among multiple user devices. In addition, one or more steps of process 600 may be incorporated into or combined with one or more steps of any other process or embodiment (e.g., process 700 (FIG. 7)).

At step 602, a media guidance application determines (e.g., via control circuitry 304 (FIG. 3)) that a user has stopped using a first device and is using a second device. For example, as discussed above the media guidance application may determine that the user has stopped using the first device and is using the second device by determining that the user has moved from a location that is associated with a first device to a location associated with the second device. For example, the first device may be a set-top box and the second device may be a car entertainment system. Both the first device and the second device may have components of user device 300 (FIG. 3). The user may associate the first device with the user's home via user input interface 310 (FIG. 3) available on the first device. The user may further associate the second device with the user's car via user input interface 310 (FIG. 3) available on the second device. The media guidance application may determine via processing circuitry 306 (FIG. 3) that the user stopped using the first device and started using the second device. For example, when the user drives her car, the media guidance application may (e.g., via a global positioning module accessible by control circuitry 304 (FIG. 3)) automatically determine that the user is no longer at home.

As described above the media guidance application may also determine (e.g., via control circuitry 304 (FIG. 3)) that the user has stopped using a first device and is using the second device by detecting that the user stopped interacting with the first device and is interacting with the second device. Both the first and second device may have components of device 300 (FIG. 3). The media guidance application may detect, via user input interface 310 (FIG. 3), user input into the first and second devices. The media guidance application may further start a timer via processing circuitry 306 (FIG. 3) to keep track of the amount of time passed since each input. When the timer reaches a threshold value which can be stored in storage 308, the media guidance application may determine that the user has stopped using the first device. After the threshold value is reached on the first device, the media guidance application may start monitoring the second device for user input. Once user input is detected on the second device, the media guidance application may determine that the user is using the second device.

In yet another example, the user may indicate to the media guidance application, via user input interface 310 (FIG. 3), that he is about to stop using the first device. The media guidance application may provide to the user a selectable indication, via display 312 (FIG. 3), that when selected by the user, via user input interface 310 (FIG. 3), indicates that the user is about to stop using the first device. Once the user selects the indication via user input interface 310 (FIG. 3), the media guidance application may present to the user via display 312 (FIG. 3) one or more devices associated with the user, for the user to select as the second device.

In step 604, in response to determining that the user has stopped using the first device and is using the second device, the media guidance application retrieves (e.g., via control circuitry 304 (FIG. 3)) a threshold length of time from memory (e.g., storage 308 (FIG. 3) and/or any location accessible via communications network 414 (FIG. 4)). For example, the media guidance application may be active on a device such as device 300 (FIG. 3). The threshold length of time may be retrieved from RAM which may be part of storage 308 (FIG. 3). Alternatively or additionally, the threshold length of time may be retrieved from any other component of storage 308 (e.g., ROM, Hard Disk, Removable Disk, etc.) or from any location accessible via communications network 414 (FIG. 4)).

In step 606, the media guidance application determines (e.g., via control circuitry 304 (FIG. 3)) a period of time beginning at a point in time when the user began using the second device and extending backwards for the threshold length of time. For example, the media guidance application may retrieve via processing circuitry 306 (FIG. 3) from storage 308 (FIG. 3) the current time. The media guidance application may then, via processing circuitry 306 (FIG. 3), calculate a time period based on the threshold length of time retrieved via circuitry 306 (FIG. 3) and the current time. The time period may further be stored in storage 308 (FIG. 3) as a combination of two values (e.g., start time and end time).

In step 608, the media guidance application determines (e.g., via control circuitry 304 (FIG. 3)) first media content consumed by the user on the first device during the period of time. For example, the media guidance application may request, via communications network 414 from the first device, media content identifiers for media content consumed by the user on the first device during the period of time on the first device. The request may include a start time and an end time that content identifiers are needed for. The identifiers may include information needed to determine a characteristic of the media content. Alternatively or additionally, the media guidance application on the first device may keep track, via processing circuitry 306 (FIG. 3), of information about media content the user is consuming on the first device and the time interval for the consumption. That information may include characteristics of the media content. The media guidance application may transmit the information over communications network 414 (FIG. 4) to media guidance data source 418, where that information may be stored in a database. When the media guidance application needs to determine what content the user has consumed during the time period, the media guidance application may request that information from media guidance data source 418 (FIG. 4) over a communications network 414 (FIG. 4).

In step 610, the media guidance application determines (e.g., via control circuitry 304 (FIG. 3)) a characteristic of the first media content. The media guidance application may receive from the first device and/or media guidance data source 418 over communications network 414, data associated with media content that the user consumed on the first device during the time period. The media guidance application may cross-reference, via processing circuitry 306 (FIG. 3), parts of the media content consumed by the user in order to determine if that content has at least one characteristic associated with it. If all of the media content consumed by the user does not share one characteristic, the media guidance application may, as described above, determine, via processing circuitry 306 (FIG. 3), a characteristic of a subset of the consumed media content. The media guidance application may determine multiple characteristics of the consumed media content based on multiple subsets.

In step 612, the media guidance application (e.g., via control circuitry 304 (FIG. 3)) recommends, based on the characteristic, second media content for consumption on the second device. For example, the media guidance application may be activated on, or send instructions to, the second device. The media guidance application may retrieve, from storage 308 (FIG. 3), a characteristic of the media content consumed on the first device. The media guidance application may then search, using control circuitry 306 (FIG. 3), media content on the second device that matches the characteristic. For example, the second device may have program listings stored in storage 308 (FIG. 3) for media content available on the device. The media guidance application may search media content listings of the second device for the characteristic. If the characteristic is a name of an actor, the media guidance application may do a textual comparison, via processing circuitry 306 (FIG. 3), between media content listings data and the actor's name. If any matches are found, the media guidance application may recommend the media content associated with matched media content listings to the user via display 312 (FIG. 3).

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 6.

Figure 7:
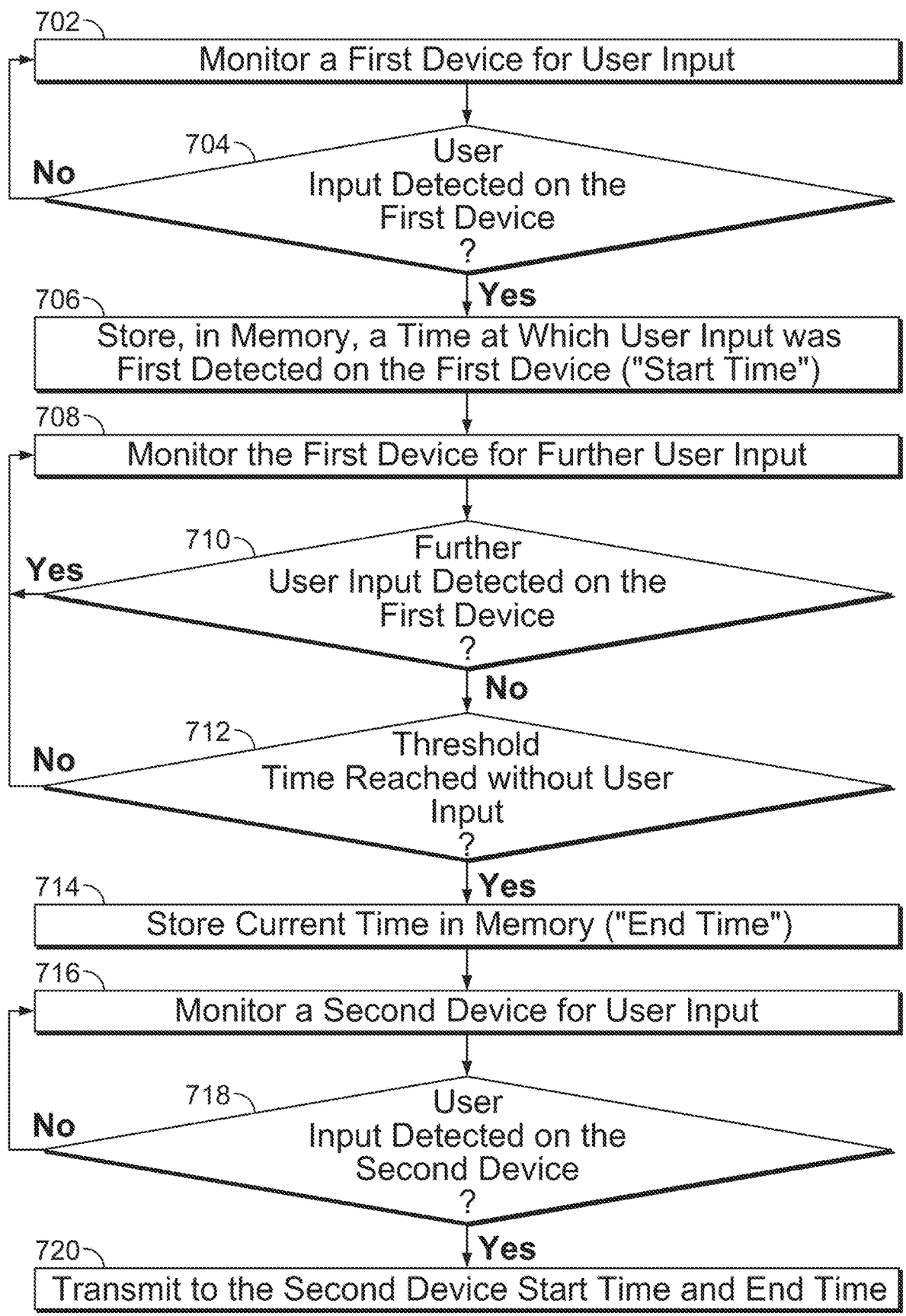
FIG. 7 is a flowchart of illustrative steps involved in determining that a user stopped using a first device and is using a second device, in accordance with some embodiments of the disclosure.

FIG. 7 is a flowchart of illustrative steps involved in determining that a user stopped using a first device and is using a second device. It should be noted that process 700 or any step thereof could be performed on, or provided by, any of the devices shown in FIGS. 3-4. For example, process 700 may be executed by control circuitry 304 (FIG. 3) as instructed by a media guidance application implemented on user equipment 402, 404, and/or 406 (FIG. 4) in order to distribute control of media guidance application operations for a target device among multiple user devices. In addition, one or more steps of process 700 may be incorporated into or combined with one or more steps of any other process or embodiment (e.g., process 600 (FIG. 6)).

At step 702, the media guidance application monitors (e.g., via control circuitry 304 (FIG. 3)) a first device for user input. For example, the media guidance application may be active on a set-top box which may have components of device 300 (FIG. 3). The user may be interacting with the set-top box via a remote control. The remote control may be sending IR signals to user input interface 310 (FIG. 3). An example of a user input may be the user, via a remote control, tuning the set-top box to a specific channel.

At step 704, the media guidance application detects, via control circuitry 304 (FIG. 3), whether a user input has been detected on the first device. If user input has not been detected, the media guidance application continues to monitor the first device for user input. If the media guidance application detects user input, the process moves to step 706.

At step 706, the media guidance application stores, in memory, a time at which user input was first detected on the first device. The stored time may represent a time when the user first started using the first device and may be stored as ("Start Time"). For example, if the media guidance application determines, via control circuitry 306 (FIG. 3), that user input was detected, it may retrieve the current time from storage 308 (FIG. 3). The media guidance application may then store the retrieved time in another section of storage 308 (FIG. 3) as Start Time. The media guidance application may also store the retrieved time again as ("Last Input Time"). The media guidance application may also start a timer, via control circuitry 306 (FIG. 3), in order to keep track of the time passed after user input.

At step 708, the media guidance application monitors (e.g., via control circuitry 304 (FIG. 3)) the first device for further user input. The media guidance application may monitor the first device for further user input in the same manner as it monitors it in step 702. However, if the first device is an electronic tablet, the user may not be interacting with it via a remote control. The user may be utilizing a touch interface of an electronic tablet for user input. The touch interface may be sending user interactions with the device to a user input interface 310 (FIG. 3). User input interface 310 (FIG. 3) may be interpreting user input and sending user input as user commands to processing circuitry 306 (FIG. 3). Processing circuitry 306 (FIG. 3) may then be executing the commands.

At step 710, the media guidance application determines (e.g., via control circuitry 304 (FIG. 3)) whether further user input has been detected on the first device. If the media guidance application determines, via control circuitry 306 (FIG. 3), that further input into user input interface 310 (FIG. 3) was detected, it may update the Last Input Time by retrieving the current time from storage 308 (FIG. 3), and storing the retrieved time again in storage 308 (FIG. 3) as Last Input Time. The media guidance application may also stop, reset and restart the counter started in step 708. The media guidance application may then continue monitoring the first device for further user input. If further user input is not detected on the first device, the media guidance application continues to step 712.

In step 712, the media guidance application determines (e.g., via control circuitry 304 (FIG. 3)) whether a threshold time without user input has been reached. The threshold time without user input may be determined beforehand and stored in storage 308 (FIG. 3). Initially, the threshold time may be set to an arbitrary number, however, as the media guidance application executes process 700 repeatedly, the threshold time may be adjusted based on threshold times of earlier executed processes 700. The media guidance application may compare, via processing circuitry 306 (FIG. 3), the stored threshold time since last user input with the time elapsed on the timer of steps 708 and 710. If the threshold time has not been reached, the media guidance application will continue monitoring the first device for further user input (step 708). If the threshold time has been reached, then process 700 will move to step 714.

In step 714, the media guidance application stores current time in memory (e.g., storage 308 (FIG. 3) and/or any location accessible via communications network 414 (FIG. 4)). The media guidance application may retrieve current time in the same manner as in step 706 and store it in storage 308 (FIG. 3) as ("End Time") to signify that the user stopped using the first device.

In step 716, the media guidance application monitors (e.g., via control circuitry 304 (FIG. 3)) the second device for user input. The media guidance application may monitor the second device for user input in the same manner as it monitors the first device in steps 702 and 708. In another example, if the second device is a car entertainment system, user input may be the user starting the car and as a result turning on the car entertainment system. Turning on the car may be considered user input in the context of the car entertainment system.

In step 718, the media guidance application determines (e.g., via control circuitry 304 (FIG. 3)) whether user input has been detected on the second device. The media guidance application may detect user input on the second device in the same manner as it detects user input on the first device in steps 704 and 710. Additionally or alternatively, the media guidance application may detect, via a microphone, the user's voice commands. The microphone may transmit the user's voice commands to user input interface 310 (FIG. 3). User input interface 310 (FIG. 3) may interpret the user's voice commands and transmit them to processing circuitry 306 (FIG. 3) for execution. If user input is not detected on the second device, the media guidance application may continue monitoring the second device for user input. Alternatively or additionally, the media guidance application may monitor multiple devices for user input. The device that receives user input at step 718 may be labelled as the second device.

At step 720, the media guidance application transmits (e.g., via control circuitry 304 (FIG. 3)) to the second device Start Time and End Time. For example, the media guidance application may be active on the first device and the second device. When user input on the second device is detected, the media guidance application may transmit from the first device, via communications network 414 (FIG. 4), a request for a Start Time and End Time stored in storage 308 (FIG. 3) of the first device. The media guidance application may then receive the Start Time and End Time from the first device.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 7.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for providing a content recommendation, the method comprising:
    determining, using processing circuitry, that a user has stopped using a first device and is using a second device;
    determining, using the processing circuitry, a characteristic that is associated with a plurality of media assets that the user consumed on the first device, wherein the plurality of media assets correspond to a first media asset type;
    determining, using the processing circuitry, a second media asset type that is supported by the second device and that is different from the first media asset type of the plurality of media assets consumed on the first device which the processing circuitry determined that the user has stopped using, wherein the first media type corresponds to one of an audio only media asset or a video-based media asset, and the second media asset type corresponds to the other of an audio only media asset or a video-based media asset;
    determining, using the processing circuitry, the content recommendation based on the determined media asset type and the characteristic that is associated with the plurality of media assets;
    determining an alert type that matches the second media asset type by selecting as the alert type an audio alert or a visual alert based on whether the second media asset type corresponds to an audio only media asset or a video-based media asset; and
    causing the alert associated with the content recommendation to be output by the second device in accordance with the selected alert type while the user is not using the first device.

2. The method of claim 1, wherein the media asset type supported by the second device comprises video content, audio content, and textual content.

3. The method of claim 1, wherein determining that the user has stopped using the first device and is using the second device further comprises detecting that the user has moved from a first location that is associated with the first device to a second location that is associated with the second device.

4. The method of claim 1, wherein determining that the user has stopped using the first device and is using the second device comprises detecting that the user has stopped interacting with the first device and is interacting with the second device.

5. The method of claim 1, wherein determining the content recommendation comprises:
    determining a resource that is accessible by the second device; and
    executing a search on the resource for a media asset that is available on the second device.

6. The method of claim 5, wherein determining the content recommendation comprises:
    filtering the available media asset based on whether the available media asset is associated with the determined characteristic, wherein the content recommendation for the second device is based on the filtered available media asset.

7. The method of claim 1, further comprising storing, using the processing circuitry, a list of devices associated with the user.

8. The method of claim 1, wherein causing the alert to be generated further comprises determining a number of media assets of the content recommendation being generated for display, wherein the alert is generated based at least in part on the number of the media assets of the content recommendation displayed on the second device.

9. The method of claim 1, further comprising:
    determining the second media asset type corresponds to an audio only media asset; and
    in response to determining the second media asset type corresponds to an audio only media asset, selecting the audio alert as the alert type;
    wherein causing the alert associated with the content recommendation to be output by the second device in accordance with the selected alert type comprises generating for output the audio alert.

10. The method of claim 1, further comprising:
    determining the second media asset type corresponds to a video-based media asset; and
    in response to determining the second media asset type corresponds to a video-based media asset, selecting the visual alert as the alert type;
    wherein causing the alert associated with the content recommendation to be output by the second device in accordance with the selected alert type comprises generating for display the visual alert.

11. A system for providing a content recommendation, the system comprising:
    input/output (I/O) interface circuitry configured to receive a user input; and
    processing circuitry configured to:
        determine that a user has stopped using a first device and is using a second device;
        determine a characteristic that is associated with a plurality of media assets that the user consumed on the first device, wherein the plurality of media assets correspond to a first media asset type;
        determine a second media asset type that is supported by the second device and that is different from the first media asset type of the plurality of media assets consumed on the first device which the processing circuitry determined that the user has stopped using, wherein the first media type corresponds to one of an audio only media asset or a video-based media asset, and the second media asset type corresponds to the other of an audio only media asset or a video-based media asset;
        determine the content recommendation based on the determined media asset type and the characteristic that is associated with the plurality of media assets;
        determine an alert type that matches the second media asset type by selecting as the alert type an audio alert or a visual alert based on whether the second media asset type corresponds to an audio only media asset or a video-based media asset; and
        cause the alert associated with content recommendation to be output by the second device in accordance with the selected alert type while the user is not using the first device.

12. The system of claim 11, wherein the media asset type supported by the second device comprises video content, audio content, and textual content.

13. The system of claim 11, wherein the processing circuitry, when determining that the user has stopped using the first device and is using the second device, further configured to detect that the user has moved from a first location that is associated with the first device to a second location that is associated with the second device.

14. The system of claim 11, wherein the processing circuitry, when determining that the user has stopped using the first device and is using the second device, further configured to detect that the user has stopped interacting with the first device and is interacting with the second device.

15. The system of claim 11, wherein the processing circuitry, when determining the content recommendation, further configured to:
 determine a resource that is accessible by the second device; and
 execute a search on the resource for a media asset that is available on the second device.

16. The system of claim 15, wherein the processing circuitry, when determining the content recommendation, further configured to filter the available media asset based on whether the available media asset is associated with the determined characteristic, wherein the content recommendation for the second device is based on the filtered available media asset.

17. The system of claim 11, wherein the processing circuitry is further configured to store a list of devices associated with the user.

18. The system of claim 11, wherein the processing circuitry, when causing the alert to be generated, is further configured to determine a number of media assets of the content recommendation being generated for display, wherein the alert is generated based at least in part on the number of the media assets of the content recommendation displayed on the second device.

19. The system of claim 11, wherein the processing circuitry is further configured to:
 determine the second media asset type corresponds to an audio only media asset; and
 in response to determining the second media asset type corresponds to an audio only media asset, select the audio alert as the alert type; and
 cause the alert associated with the content recommendation to be output by the second device in accordance with the selected alert type by generating for output the audio alert.

20. The system of claim 11, wherein the processing circuitry is further configured to: determine the second media asset type corresponds to a video-based media asset; and in response to determining the second media asset type corresponds to a video-based media asset, select the visual alert as the alert type; and cause the alert associated with the content recommendation to be output by the second device in accordance with the selected alert type by generating for display the visual alert.

* * * * *